Aug. 14, 1934.
E. C. McCOY
1,970,331
VEHICLE LAMP CONTROLLING MEANS
Filed June 24, 1933  3 Sheets-Sheet 1
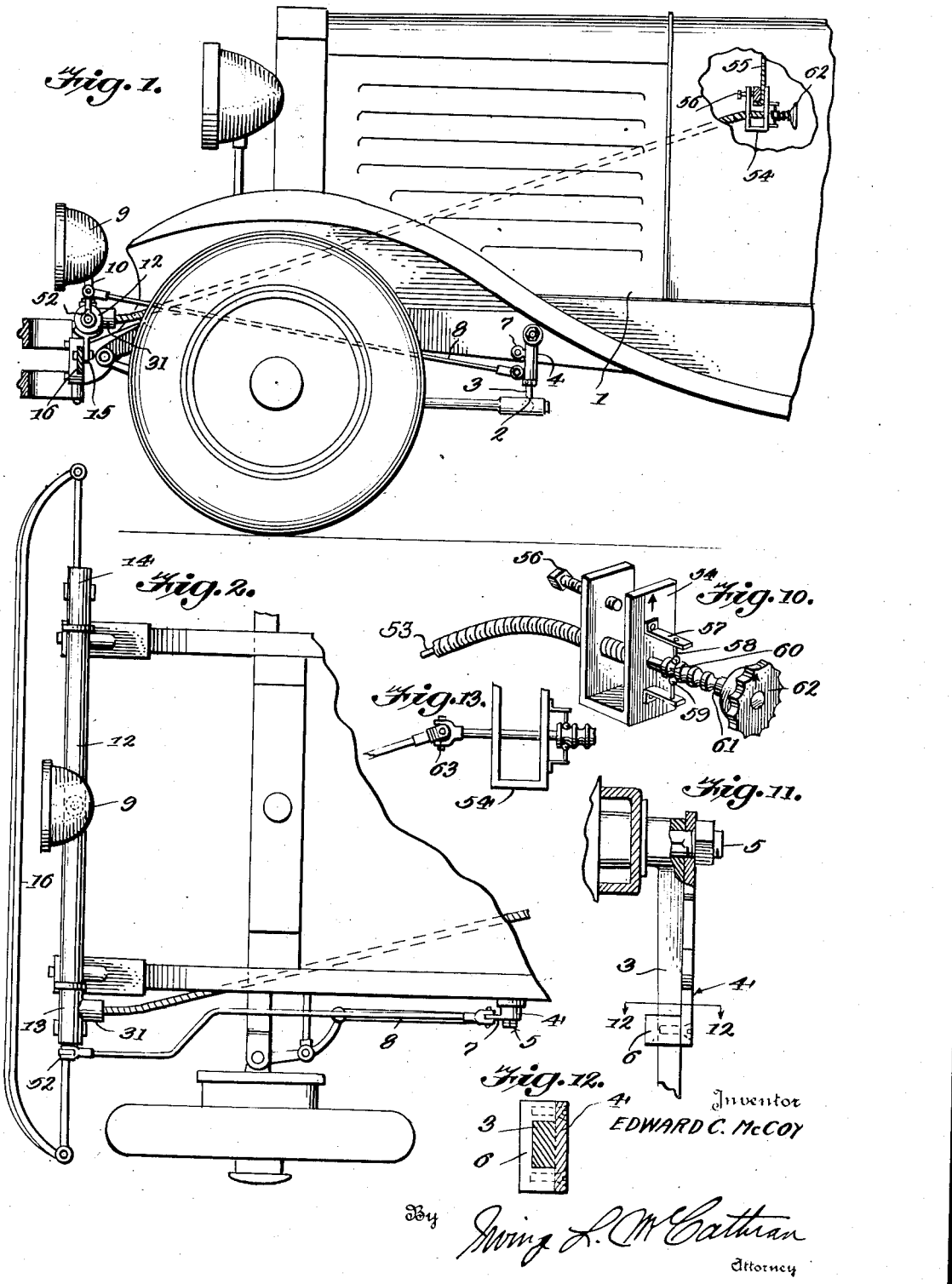
Inventor
EDWARD C. McCOY Aug. 14, 1934.  E. C. McCOY  1,970,331
VEHICLE LAMP CONTROLLING MEANS
Filed June 24, 1933    3 Sheets-Sheet 2
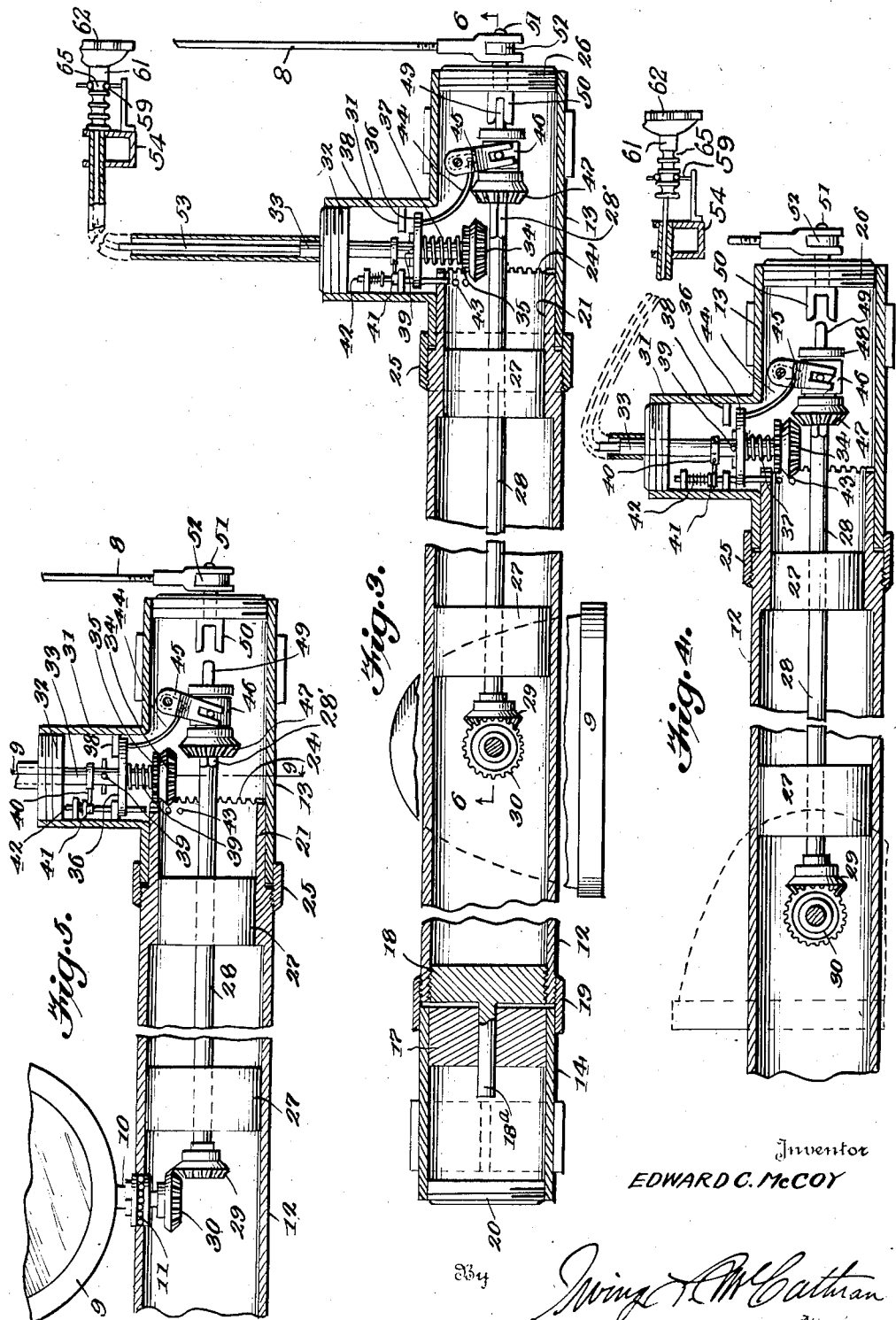
Inventor
EDWARD C. McCOY Aug. 14, 1934.                E. C. McCOY                 1,970,331
                       VEHICLE LAMP CONTROLLING MEANS
                          Filed June 24, 1933        3 Sheets-Sheet 3
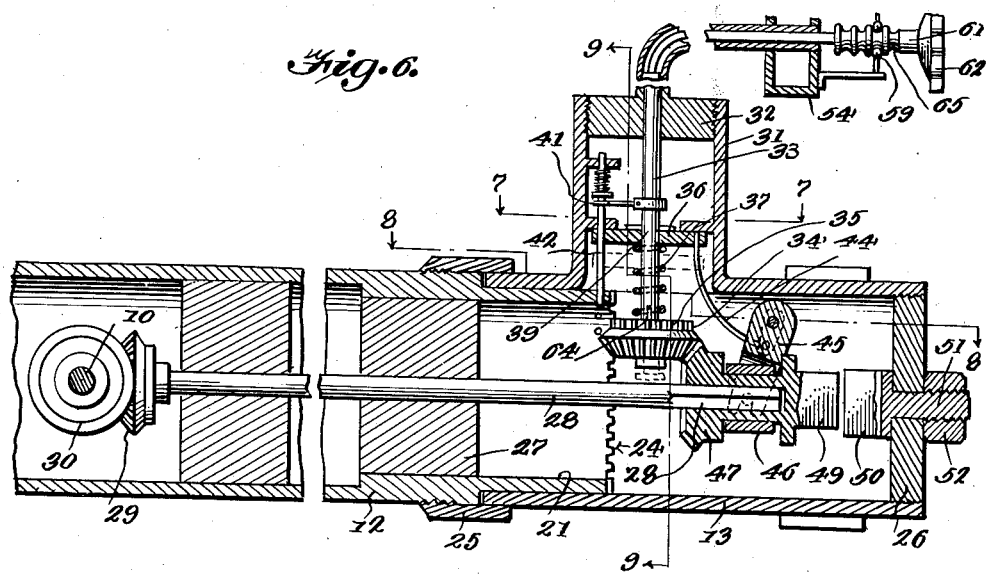
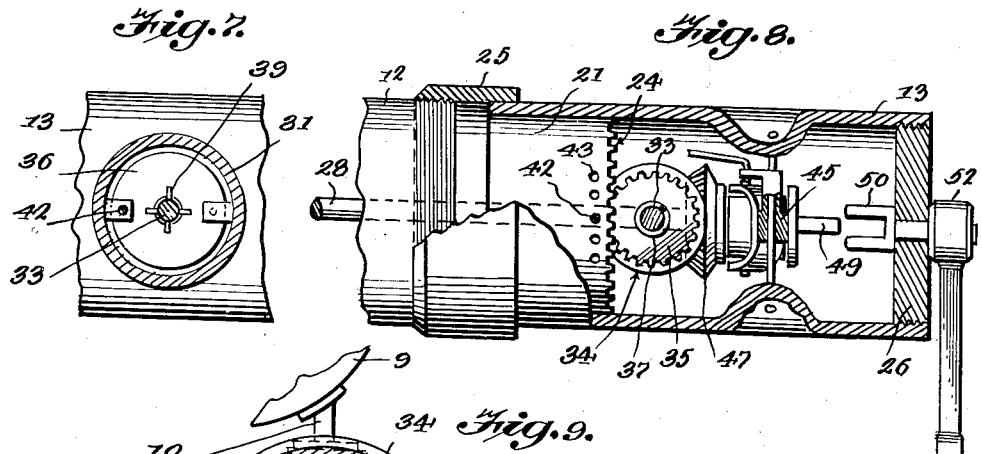
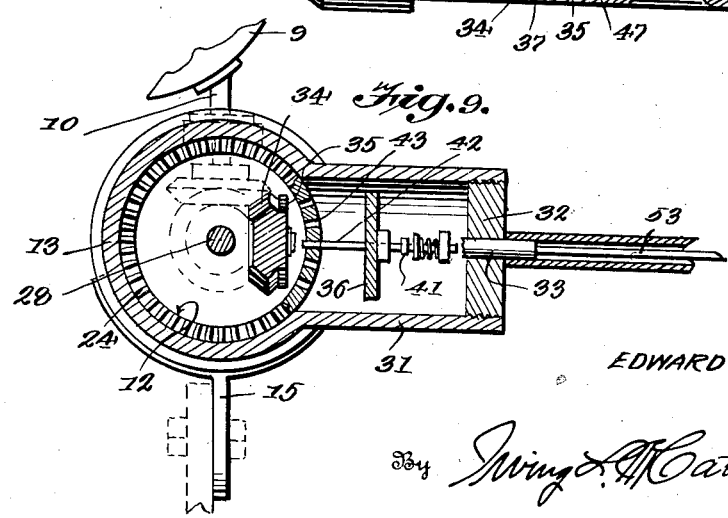
Inventor
EDWARD C. McCOY Patented Aug. 14, 1934

1,970,331

UNITED STATES PATENT OFFICE 1,970,331

VEHICLE LAMP CONTROLLING MEANS

Edward Collier McCoy, Tunkhannock, Pa.

Application June 24, 1933, Serial No. 677,498

9 Claims. (Cl. 240—61.3)

This invention relates to dirigible headlights or spotlights for automobiles, and other vehicles, and has for its object the production of a simple and efficient headlight or spotlight and means for controlling the same whereby the light may be adjusted with respect to both its vertical, as well as its horizontal axis.

Another object of this invention is the production of a simple and efficient means which may be adjusted in such a manner as to permit the light or lamp to be either automatically operated with the steering mechanism of the vehicle, independently operated by manual adjustment, or adjusted manually from the driver's seat to suit the convenience of the operator.

A further object of this invention is the production of a simple and efficient means for permitting numerous selective operations of the lamp whereby the lamp may be either automatically operated for adjustment with respect to its vertical axis from the steering mechanism of the vehicle, or may be manually operated from the driver's seat so as to adjust the lamp with respect to its horizontal axis.

Other objects and advantages of the present invention will appear throughout the following specification and claims.

In the drawings:—

Figure 1 is a side elevation of the improved mechanism, certain parts being shown in section;

Figure 2 is a top plan view of the forward portion of an automobile showing the improved headlight or spotlight operating mechanism mounted thereon;

Figure 3 is a horizontal sectional view through the supporting tube and casings upon which the lamp is adapted to be mounted, showing the parts in proper position for turning the light from the steering gear;

Figure 4 is a longitudinal sectional view through one end of the casing and tube showing the operating parts in a neutral position for permitting the lamp and supporting standard to be freely turned right or left by hand;

Figure 5 is a view similar to Figure 4, the operating parts and actuating clutch being shown in a light tilting position whereby the lamp or light may be tilted by hand from the driver's seat or dashboard;

Figure 6 is an enlarged longitudinal sectional view through one end of the casing and a portion of the lamp supporting tube illustrating the lamp controlling mechanism in a position for rotating the lamp and standard by hand from the driver's seat or through the operation of the dashboard mechanism;

Figure 7 is a section taken on line 7—7 of Figure 6;

Figure 8 is a section taken on line 8—8 of Figure 6;

Figure 9 is a section taken on line 9—9 of Figure 6;

Figure 10 is a detail perspective view of the operating knob and supporting bracket and illustrating a portion of the flexible shaft, this mechanism being adapted to be supported upon the dash;

Figure 11 is an edge elevation of the steering gear arm showing the connecting bracket carried thereby and certain of the parts being shown in section;

Figure 12 is a section taken on line 12—12 of Figure 11; and

Figure 13 is a side elevation illustrating a type of universal rod connection which may be substituted for the flexible shaft illustrated in Figure 10.

It should be understood that the present invention is adaptable for use in connection with any vehicle and that any number of lamps may be operated from the same operating mechanism although for practical purposes one lamp is ordinarily found to be sufficient.

By referring particularly to the drawings, it will be seen that the present invention is illustrated as used particularly with an automobile or other motor vehicle indicated by the numeral 1, which is provided with the conventional steering gear mechanism 2 comprising a steering gear arm 3. To this steering gear arm 3 is secured a suitable plate 4 which passes over the supporting bolt 5 and has its lower end anchored in engagement with the steering gear arm 3 by means of a substantially U-shaped yoke 6 illustrated clearly in Figures 11 and 12. This yoke 6 may be secured to the plate 4 in any suitable or desired manner, such for instance as by means of screws illustrated in dotted lines in Figures 11 and 12. The plate 4 is preferably provided with a pair of laterally projecting apertured ears 7 and to one of these ears 7 is pivotally secured the lamp operating rod 8, this rod being adaptable to be secured to either of the ears 7 to provide a proper adjustment of the lamp.

A suitable lamp housing 9 is supported upon a vertically extending standard 10 and this standard is carried by a suitable bearing 11 which bearing 11 is carried or supported upon an elongated tubular member 12, the lamp 9 preferably extending vertically of the tubular casing 12. This tubular casing 12 is journaled at each end upon the supporting housings 13 and 14. These housings 13 and 14 are provided with suitable supporting ears 15 which extend downwardly and are preferably apertured to permit these ears 15 to be secured to the bumper 16 in any suitable or desired manner. These housings 13 and 14 will therefore be firmly anchored against movement with respect to the supporting bumper 16, and as stated above, any suitable or desired means may be employed for anchoring these housings 13 and 14 in position.

The housing 14 carries a suitable bushing 17 and the tubular casing 12 carries at one end a threaded plug 18 having a projecting cylindrical shaft 18a which is journaled within the bushing 17. A collar 19 is carried by the tubular casing 12, as shown in Figure 3, and this overhangs the joint between the housing 14 and the tubular casing 12 and constitutes a dust seal or protector for the joint between the housing 14 and the tubular casing 12. The outer end of the housing 14 may be closed in any suitable or desired manner, such for instance as by means of a plug 20.

The opposite end of the tubular casing 12 is supported by the housing 13, as shown clearly in Figure 3, and is provided with a reduced projecting neck 21 having a ring gear 24 formed at its periphery or edge, this neck 21 extending well within the housing 13. A collar 25 is carried by the tubular casing 12 and this collar overhangs the joint between the housing 13 and the tubular casing 12, as shown in Figure 3 to constitute a dust shield similar to the collar 19 previously described. The outer end of the housing 13 is closed by means of a suitable plug 26. The tubular casing 12 carries a pair of spaced bushings 27 within the length thereof, which bushings 27 constitute a journal or support for the lamp operating shaft 28 which shaft extends longitudinally of the tubular casing 12 and projects well into the housing 13, as shown in detail in Figures 3 to 5, inclusive. The inner end of this shaft 28 carries a bevel 29 which at all times meshes with the bevel gear 30 carried by the lamp supporting standard 10 to cause the rotation of the lamp supporting standard with respect to its vertical axis when the shaft 28 is rotated.

The housing 13 is provided with a rearwardly projecting neck 31 which is closed at its outer end by means of a suitable plug 32. A plunger shaft 33 is rotatably and reciprocably mounted through the plug 32, and the inner end of this plunger shaft 33 carries a bevel gear 34 and a closely arranged or mounted flat or spur gear 35. A disc 36 is also carried by the shaft 33 and a coil spring 37 is preferably interposed between the gear 35 and one face of the disc 36, as shown clearly in the drawings. A plurality of stop lugs 38 are carried by the inner face of the neck 31 and constitute abutments against which the disc 36 may rest to limit the longitudinal movement of the disc 36 in one direction through the neck 31. A plurality of pins 39 are carried by the shaft 33 and overhang the disc 36 so as to permit the disc 36 to be forced out of engagement with the lugs 38 when the shaft 33 is pushed inwardly to shift the position of the gears 34 and 35. An arm 40 is supported by the shaft 33 in a manner to permit the shaft 33 to freely rotate, and the arm 40 is provided with a suitable eye 41 through which eye 41 extends a spring pressed plunger rod 42, this plunger rod 42 passing through suitable supporting members carried by the neck 31. This plunger rod 42 also passes through the disc 36 and holds the disc 36 against rotation, and gives the disc 36 and the shaft 33 a more perfect balance. A plurality of apertures 43 are formed in the reduced neck 21 of the tubular member 12 near the end thereof, as shown clearly in Figures 4 to 9, inclusive, thereby permitting this spring pressed plunger rod 42 to engage one of the apertures 43 and lock the tubular member 12 against rotation with respect to the housing 13 when the plunger shaft 33 is pushed inwardly to the position shown in Figures 3, 4 and 9. In this way, the tubular casing 12 will be locked against rotation with respect to the housing 13 when the plunger shaft 33 is properly adjusted, as will be hereinafter more fully described.

A curved steel wire or arm 44 which possesses a certain amount of resiliency is carried by the disc 36 and engages a pivoted clutch fork 45 which is pivotally mounted within the housing 13. This clutch fork 45 engages a sleeve 46 and this sleeve carries a bevel gear 47, the sleeve and bevel gear 47 being slidably mounted upon the squared end 28' at the end of the shaft 28. The gear 47 is adapted to freely rotate within the sleeve 46 but is so mounted as to reciprocate therewith and is keyed for sliding movement upon the shaft 28 whereby rotary movement will be imparted to the shaft 28 when the gear 47 is driven. The gear 47 is provided with a shank portion 48 having a projecting tongue 49 which may be slightly rounded at its outer end and this tongue 49 is adapted to interfit with the grooved plate 50, which grooved plate 50 is carried by the stub shaft 51 which stub shaft 51 is rotatably mounted within the plug 26. This shaft 51 is secured to an arm 52, which arm 52 is connected to the forward end of the lamp operating rod 8.

The plunger shaft 33 is adapted to be connected with a flexible shaft 53, which flexible shaft 53 passes through a U-shaped bracket 54, shown clearly in Figure 10. This U-shaped bracket 54 may be clamped upon the dash 55 by means of a suitable clamping screw 56. Bracket arms 57 are secured to the front face of the U-shaped bracket 54 and carry spring fingers 58 which are provided with circular knobs 59, these circular knobs 59 being adapted to selectively fit in the circular grooves 60 formed in spaced relation within the length of the shank 61 which supports the operating knob 62. By considering Figure 10, it will be seen that the shank 61 may be moved inwardly or pulled outwardly to cause the spring fingers 58 to selectively register with certain grooves 60, thereby holding the shank 61 in longitudinal adjusted position and at the same time, due to this structure, the operating knob 62 may be freely rotated for the purpose of rotating the flexible shaft 53 in any of its longitudinally adjusted positions.

If it should be so desired, the flexible shaft 53 may be replaced by a universally connected shaft, as indicated by the numeral 63, without departing from the spirit of the invention. This structure is clearly shown in Figure 13.

Various selective adjustments may be provided for and in Figure 6 there is shown a slightly modified structure wherein the bevel gear 34 and the spur or flat gear 35, which really constitute a single element, are keyed upon the shaft 33 by means of a suitable key-way 64 to permit the shaft 33 to slide through the gear 34. The spring 37, however, is of a sufficient tension to normally hold the disc 36 and the gear 34 in proper spaced relation when the parts are in the position shown in Figure 6 to cause the gear 34 to mesh with the gear 47 and permit the lamp to be rotated on its vertical axis by rotating the shaft 33 from the operating knob 62 carried on the dash. If it is desired, however, in this structure to shift the gear 47 out of engagement with the gear 34, the plunger shaft 33 is merely pushed further inwardly to cause the knobs 59 to engage the last notch 65 formed in the shank 61. This pressure inwardly upon the plunger shaft 33 and the disc 36 will force the steel wire 44 to change the position of the fork 45, thereby shifting the gear 47. The parts will then be adjusted so as to cause the lamp to be rotated simultaneously with the operation of the steering apparatus since the tongue or lug 49 will fit in the slotted plate 50 providing a proper connection.

The operation of the device is as follows:— As previously described, the shank 61 is provided with a suitable number of notches, that is to say, three or four, depending upon the number of positions which are desired. Counting from the notch nearest the dash, the notches will be referred to as first, second, third and fourth notch, corresponding with the first, second, third, or fourth position of the gear 34 which is carried by the shaft 33. Presuming that the shank 61 has been adjusted so as to cause the knob 59 to register with the first notch, the gear 34 will be in the position shown in Figure 5 and the spur gear 35 will be in mesh with the ring gear 24. The tongue 49 will be out of engagement with the slotted plate 50 and the gear 47 will remain inactive. The shaft 33, however, may then be rotated by means of rotating the knob 62 and flexible shaft 53 for imparting rotary movement to the gear 35 and to the ring gear 24 which will rotate the casing 12 carrying the lamp 9 and permit the lamp to be tilted by the operator from the driver's seat through the manipulation of the knob 62 to throw the light rays from the lamp in an upward direction for facilitating the reading of a road sign at night when desired. In this position the spring pressed plunger 42, as shown in Figure 5, will be held out of engagement with the apertures 43 due to the fact that the arm 40 carried by the shaft 33 will hold the spring pressed plunger in this position. The lamp 9, when the parts are in this position, may be swung upon its horizontal axis through the rotation of the tubular casing 12 so as to throw the rays of light from the lamp 9 at a desired angle or in a desired upward direction.

Should it be desired to throw the parts into neutral position, the shank 61 may be shifted to cause the third notch to engage the knobs 59 whereupon the shaft 33 will be moved inwardly a sufficient distance within the neck 31 to cause the gear 35 to be thrown out of mesh with the ring gear 24 and at the same time prevent the gear 34 from meshing with the gear 47. The spring pressed plunger 42, when the parts are in the position shown in Figures 5 and 6, will engage one of the apertures 43 to hold the tubular casing 12 against rotation and in a set position, thereby preventing the lamp from changing its position under the vibration of the machine while in operation, this plunger rod 42 constituting a stabilizing means to hold the lamp in its proper set position and thereby prevent the lamp from tipping over.

To put the light in neutral position it is my idea to use the third notch that engages knobs 59 (see Figure 4). The spring pressed plunger 42 is engaged in one of the apertures 43 when the light is in a position to be turned by hand (Figure 6).

The second notch is used when light is to be turned by hand. While not in use, the light is always in the position as shown in Figure 6. An arrow on the face of the knob 62, shown in Figure 10, is a guide for centering the light. If the light is not in this position while not in use, it will turn from the vibrating of the car. When the parts are in a position shown in Figure 6 the light will be held in place when not in use. When the parts are in the position shown in Figure 6, the light may be turned by hand. The plunger 42 and gear 35 are timed. As in Figure 6, the light is about to be turned in a position for sign reading; a slight pull on the shaft 33 disengages gears 34 and 47 at the same time plunger 42 is being lifted by the eye 41. This operation will unlock the tubular casing 12 and as the tubular casing 12 is unlocked, gear 35 is thrown into mesh with the ring gear 24, thereby causing the ring 24 to be locked in mesh with gear 35. When gear 35 is completely meshed with the ring gear 24, the plunger 42 is completely unlocked from the ring gear 24. Due to the small amount of space in the operations of the parts shown in Figures 5 and 6, it would be impossible to use the neutral position in notch 2.

By shifting the shank 61 so that the knobs 59 will engage the second notch in the shank 61, counting from the outer end of the shank, the parts will be adjusted to the position shown in Figure 6 whereby the light may be turned by hand upon its vertical axis through the rotation of the knob 62 by the operator from the driver's seat. The gear 34 will then mesh with the gear 47 and the tongue 49 will be held out of engagement with the notch plate 50 and the tubular member 12 will be held against rotation by means of the spring pressed plunger 42. By rotating the knob 62, the flexible shaft 53 will be operated for imparting rotary movement to the gear 34, to the gear 47, to the shaft 28, to the gear 29, to the gear 30, and consequently, to the lamp supporting standard 10 for rotating the lamp 9 upon its vertical axis to the desired position.

When it is desired to cause the lamp 9 to act as a dirigible headlight and to be automatically operated with the steering mechanism, the shank 61 is adjusted to cause the knobs 59 to engage the fourth notch and the further inward pushing of the rod 33 will cause the steel wire or arm 44 to swing the yoke 45 to the position shown in Figure 3 and disengage the gear 47 from the gear 34 and at the same time cause the tongue 49 to engage the slotted plate 50 forming a clutch engagement between the shaft 28 and the shaft 51 whereby the shaft 28 and the lamp 9 will be properly turned simultaneously with the shifting of the lamp operating rod 8 which is actuated by the steering apparatus. During this time the gear 34 will remain inactive but the spring pressed plunger rod 42 will lock the tubular casing 12 against rotation with respect to the housing 13.

From the foregoing description, it will be seen that a very simple and efficient means has been provided whereby the headlight of a vehicle may be operated through proper adjustment of the parts to automatically operate as a dirigible headlight simultaneously with the operation of the steering apparatus, and may also be adjusted to a neutral position for rendering the light inactive in its movement, whereby the light may be manually swung to a desired position by an operator to permit the rotation of the light to a desired point for throwing the rays of the light in a desired direction, such for instance, in the direction of a front wheel while repairs are being made. A further adjustment may be made whereby the position of the lamp may be adjusted manually from the driver's seat to rotate the lamp on its vertical axis and by a proper adjustment, the lamp may be further swung upon its horizontal axis whereby the rays of the lamp may be thrown in an upward direction, this adjustment being possible by the operation of the mechanism located near the driver's seat.

It should be understood that certain detail changes in the mechanical construction, combination and arrangement of parts may be employed without departing from the spirit of the invention, so long as such changes fall within the scope of the appended claims.

Having described the invention, what is claimed as new is:—

1. A device of the class described comprising a lamp supporting means, a housing at each end of said lamp supporting means for anchoring the lamp supporting means upon a support, said lamp supporting means being journaled at each end upon said housings and capable of rotation upon its horizontal axis, said lamp supporting means comprising an elongated tubular structure a remotely controlled means associated with said lamp supporting means, gear means operated by said remotely controlled means for rotating said lamp supporting means upon its horizontal axis, means for rotating said lamp on its vertical axis, a clutch for throwing said last mentioned means into and out of operation, and means for attaching said last mentioned means to the steering arm of a vehicle comprising a plate adapted to fit over said arm.

2. A device of the class described comprising an elongated lamp supporting tube, a supporting housing at each end of said tube constituting journals therefor, said tube having a ring gear formed at one end, a manually operated gear adapted to engage said ring gear for imparting rotary movement thereto for rotating said lamp supporting tube on its horizontal axis, means for shifting said manually operated gear into and out of engagement with said ring gear, said manually operated gear being carried by a plunger shaft, an arm carried by said plunger shaft, a spring pressed plunger passing through said arm, said tube having a plurality of apertures formed therein near its end for receiving said spring pressed plunger rod, and said arm being adapted to hold said spring pressed plunger rod out of engagement with said aperture when said manually operated gear engages said ring gear and permitting said spring pressed plunger to assume locking engagement with said apertures when said manually operated gear is shifted to a disengaging position.

3. A device of the class described comprising a lamp supporting member, a housing for supporting said lamp supporting member and permitting rotation of said lamp supporting member on its horizontal axis, a lamp supporting rod carried by said lamp supporting member, means for rotating said lamp supporting rod on its vertical axis, means for automatically rotating said lamp supporting bar simultaneously with the steering mechanism of the vehicle, other means for manually rotating said lamp supporting rod on its vertical axis, clutch means for throwing the automatic as well as the manually operating means into and out of selective engagement, said manually operating means comprising a longitudinally movable shifting shaft, and an arm connected to said shaft and engaging said clutch means whereby said clutch means may be shifted to permit of the selective turning of the lamp supporting rod either automatically or manually.

4. A device of the class described comprising a lamp supporting member, a housing constituting a journal for said lamp supporting member, a lamp supporting bar carried by said lamp supporting member, means for rotating said lamp supporting bar on its vertical axis, said last mentioned means comprising a driving shaft, a bevel gear slidably mounted upon one end of said shaft, means forming a connection with the steering mechanism of a vehicle having a slotted plate carried thereby within the housing, said bevel gear carrying a projecting tongue adapted to be shifted into and out of engagement with said slotted plate for providing a clutch element, a swinging fork pivotally mounted within said housing, manually operated means for swinging said fork for moving said tongue to a clutching position and said bevel gear out of a clutching position whereby said lamp supporting bar may be automatically operated with the steering mechanism of a vehicle, and means for automatically and releasably locking the manually operated means in an adjusted position.

5. A device of the class described comprising a lamp supporting member, a housing constituting a journal for said lamp supporting member, a lamp supporting bar carried by said lamp supporting member, means for rotating said lamp supporting bar on its vertical axis, said last mentioned means comprising a driving shaft, a bevel gear slidably mounted upon one end of said shaft, means forming a connection with the steering mechanism of a vehicle having a slotted plate for providing a clutch element, interfitting clutch means formed upon said bevel gear for engaging said slotted plate, a swinging fork pivotally mounted within said housing, manually operated means for swinging said fork for moving said bevel gear to an engaging position with said slotted plate whereby said lamp supporting bar may be automatically operated with the steering mechanism of a vehicle, means for automatically and releasably locking the manually operated means in an adjusted position, a bevel gear carried by said manually operated means and adapted to be adjustably moved into adjusted relation with said first mentioned bevel gear when said first mentioned bevel gear is in a free position, and means carried by said manually operated means and movable into and out of engagement with said lamp supporting means for rotating said lamp supporting means on its horizontal axis.

6. A device of the class described comprising a lamp supporting member, a housing constituting a journal for said lamp supporting member, a lamp supporting bar carried by said lamp supporting member, means for rotating said lamp supporting bar on its vertical axis, said last mentioned means comprising a driving shaft, a bevel gear slidably mounted upon one end of said shaft, means forming a connection with the steering mechanism of a vehicle having a slotted plate for providing a clutch element, a swinging fork pivotally mounted within said housing, manually operated means for swinging said fork for moving said bevel gear to an engaging position with said slotted plate whereby said lamp supporting bar may be automatically operated with the steering mechanism of a vehicle, means for automatically and releasably locking the manually operated means in an adjusted position, a bevel gear carried by said manually operated means and adapted to be adjustably moved into adjusted relation with said first mentioned bevel gear when said first mentioned bevel gear is in a free position, means carried by said manually operated means and movable into and out of engagement with said lamp supporting means for rotating said lamp supporting means on its horizontal axis, and means for selectively locking the lamp supporting means against rotation on its horizontal axis.

7. A lamp supporting means of the class described comprising a housing, a lamp carried by said lamp supporting means, a remotely controlled manually operated rotating and reciprocating shaft, means for holding said shaft in selective longitudinally adjusted positions, and also permitting the free rotation of said shaft, a disc carried by said shaft, abutment lugs limiting the movement of said disc in one direction, a driving gear carried by one end of said shaft and having longitudinally sliding movement thereon, means for limiting the sliding movement of said gear in one direction, means engageable by said gear for rotating said lamp on its vertical axis through the manual operation of said shaft, means connected to said disc and shiftable thereby for disengaging the manually operated means from the lamp turning means, means carried by the manually operated means for engaging said lamp supporting means and rotating the same on its horizontal axis, and means controllable by said manually operated means for selectively locking the lamp supporting means against rotation on its horizontal axis.

8. A device of the class described comprising a lamp supporting means, means for journaling said lamp supporting means to be rotated upon its horizontal axis, a remotely controlled means associated with said lamp supporting means for manually rotating said lamp supporting means about its horizontal axis and bodily movable out of engagement with said lamp supporting means to render said lamp supporting means independent of said remotely controlled means, means for rotating said lamp upon its vertical axis, a clutch for throwing said last mentioned means into and out of operation, means connecting said bodily movable means with said clutch for controlling the bodily movement of said clutch to and from a clutching position, and means controlled by said bodily movable means for locking said lamp supporting means against rotation.

9. A device of the class described comprising a tubular lamp supporting member, a lamp carried by said tubular supporting member and rotatable upon its vertical axis upon said tubular supporting member, means for rotating said lamp upon its vertical axis, bodily movable driving means manually controlled shiftable into and out of engagement with said lamp supporting tubular member for rotating said lamp supporting tubular member upon its horizontal axis, connecting means for forming a connection with the steering wheels of a vehicle, means engageable by said bodily movable driving means for manually rotating said lamp upon its vertical axis, and movable clutch means shiftable into and out of engagement with said bodily movable driving means and into engagement with said connecting means forming a connection with the steering wheels of the vehicle to selectively rotate the lamp upon its vertical axis either manually or automatically.

EDWARD COLLIER McCOY.